United States Patent [19]
Dion

[11] Patent Number: 5,933,640
[45] Date of Patent: Aug. 3, 1999

[54] METHOD FOR ANALYZING AND PRESENTING TEST EXECUTION FLOWS OF PROGRAMS

[75] Inventor: Jeremy Dion, Palo Alto, Calif.

[73] Assignee: Digital Equipment Corporation, Houston, Tex.

[21] Appl. No.: 08/806,591

[22] Filed: Feb. 26, 1997

[51] Int. Cl.[6] .................................................. G06F 9/45
[52] U.S. Cl. ......................................................... 395/704
[58] Field of Search .................................. 395/704, 705, 395/707, 708, 500, 183.11, 183.13, 183.14

[56] References Cited

U.S. PATENT DOCUMENTS

| | | | |
|---|---|---|---|
| 5,050,168 | 9/1991 | Paterson .............................. | 395/183.11 |
| 5,313,616 | 5/1994 | Cline et al. .............................. | 395/500 |
| 5,507,030 | 4/1996 | Sites ....................................... | 395/704 |
| 5,539,907 | 7/1996 | Srivastava et al. ...................... | 395/705 |
| 5,732,273 | 3/1998 | Srivastava et al. ...................... | 395/704 |

OTHER PUBLICATIONS

Neuder, D.L., "A Test Verification Tool for C and C++ Programs," Hewlett-Packard Journal, v42, n 2, p. 83(10), Apr. 1991.

Cohn et al., "Hot Cold Optimization of Large Windows/NT Applications," Proc. 29th Ann. IEEE/ACM Int. Symp. MicroArch., IEEE Comp. Soc. Press, pp. 80–89, Dec. 1996.

*Primary Examiner*—Tariq R. Hafiz
*Assistant Examiner*—Peter J. Corcoran, III
*Attorney, Agent, or Firm*—Hamilton, Brook, Smith & Reynolds, P.C.

[57] ABSTRACT

A computer implemented method analyzes an execution of a program. The method partitions the program into program components such as basic blocks and procedures. A source or executable representation of the program is instrumented to collect test coverage data. In addition, a flow graph representing the program components is generated. The program is then executed to collect test coverage data. Using the test coverage data and the flow graph, the program is partitioned into executed and unexecuted components. The number of instructions in each unexecuted program component is counted. Thus, a list of the unexecuted program components can be presented according to a decreasing order of the number of unexecuted instructions in the unexecuted program components.

15 Claims, 9 Drawing Sheets

700 x.c: 128  This test in p:
128++ } else if (j==1)
x.c: 130: Never reached this code:
'98% in call of q( at line 131)
130    } else {
131--     q();
            1%
x.c: 126: This test in p:
126++    if (i==1) {
x.c: 127: Never reached this code:
127--     i=j=0;

FIG.7

```
---|---|---|---| 18.1% |---|---|---
compress.c: 663: This test in main:
663 ++    if (do_decomp == o) compress ( ) ;
compress.c: 665: Never reached this code:
          ('8.1% in call decompress at line 665)
665 +-        else decompress ( );
```

METHOD FOR ANALYZING AND PRESENTING TEST EXECUTION FLOWS OF PROGRAMS

FIELD OF THE INVENTION

This invention relates generally to computer systems, and more particularly to analyzing execution flows during the testing of programs.

BACKGROUND OF THE INVENTION

An important step in producing a high quality software program is to test the program before it is generally released. A poorly tested program increases production costs and time, and decreases user satisfaction. As programs become more complex, it becomes more difficult to ensure that a program has been adequately tested. An adequate test exercises as much functionality of the program as possible with input data that are representative of real data processing problems. The testing should reveal if the program has any flaws in its design.

One way of verifying program testing is called "test coverage analysis." Test coverage analysis measures the scope and quality of a test by determining how much of the program was exercised during the test. Typically, test coverage analysis requires three major steps. First, the program to be tested is modified so that its execution can be monitored. The modifications generally entail adding instructions to the program. The "monitoring" instructions will divert the execution flow to monitoring procedures which can record the fact that a portion of the monitored program has been executed.

Normally, code modification, or "instrumentation" as this is sometimes known, is done in two ways. Either the source code is modified and the modified program is compiled as usual, or an executable image of the program is modified.

In either case, during a second step, the modified code is loaded for execution into a memory of a computer system. During execution of the modified program, the execution flow is intercepted at the instrumented instructions. The monitoring procedures can then gather and record test coverage data which are significant of the operation of the program.

During a final step, the test coverage data are analyzed to determine the behavior of the program in response to a particular set of input data. During this step, it can be determined if all portions of the program were adequately tested. If this is not the case, then the input test data can be modified, and the testing cycle can be repeated until a significant portion of the program is tested.

Conventionally, test coverage data have been presented as an annotated listing of the source code. Table 1 shows such an example listing.

TABLE 1

| | | |
|---|---|---|
| 125 | ++ | void p(int I, int j) { |
| 126 | ++ | if (I==1) { |
| 127 | -- | I=j=0; |
| 128 | ++ | } else if (j==1) { |
| 129 | ++ | k=0; |
| 130 | | } else { |
| 131 | -- | q( ); |
| 132 | ++ | } |
| 125 | ++ | } |

In the table, each source code line is preceded by a line number and a code. The code "++" indicates that the line was executed during the test. The code "--" indicates that the line was not executed. The uncoded lines do not have any equivalent expression in the machine executable image.

In this example listing, it can be seen that during the test, "I==1" on line 126 always failed because line 127 was never executed. The test for "j==1" on line 128 always succeeded because line 129 was executed, but line 131 was not.

This manner for presenting test coverage data is relatively easy to understand for simple small programs. However, real programs may include thousands of lines of code distributed over possibly hundreds of source code files. Program developers rarely read source files serially from start to end, but this is just what is demanded by this type of presentation.

More importantly, this type of presentation does not readily distinguish what is important, from what can be ignored. In practice, test coverage of an entire program can never be complete. For various reasons, such as program complexity, and many possible input states, only about 80% to 90% of coverage is typically attainable. The remaining unexercised code can be scattered over tens or hundreds of source files. A serial perusal of the entire analysis presentation to uncover potential design flaws can consume extra time, and introduce errors.

A more useful presentation of test coverage data would take into consideration the logical structure of the program, and quickly suggest how to change the test to cause more of the code to be executed. Moreover, the test coverage information would be presented to a user in a form which is not necessarily serially organized according to the order of the instructions. In contrast to the linear listing above, a useful presentation would focus on the significant unexecuted portions of the program so testing could be improved.

SUMMARY OF THE INVENTION

The invention provides a computer implemented method for monitoring an execution of a program. The program is instrumented by inserting call instructions into the program. The call instructions are to intercept an execution of the program. The call instructions can direct the execution to monitoring routines for collecting execution data.

In addition, a partial or complete flow graph is generated for the program. The flow graph represents the logical structure of the program as nodes, and possible paths through the program or machine code as directed arcs connecting the nodes. The nodes can be components of the program, for example, groups of individual machine executable instructions called basic blocks. A basic block is a group of linearly executed instructions having one entrance and one exit point.

The directed arcs which link the nodes begin at an exit point and end at an entry point of a destination block. Exit points which are flow control instructions, for example conditional branch and jump instructions, are called decision points. A basic block or procedure ending in a decision point has more than one arc leaving the block, and therefore, multiple possible destinations.

For example, in a block ending with a conditional branch instruction, one arc ends at the block which is the destination if the branch is taken, and the other arc ends in the next sequential block which is reached if the branch is not taken.

Basic blocks corresponding to each source code procedure are further identified and grouped, and entry and exit points of the procedures are identified. In the graph, procedures are linked by connecting a block containing a call instruction with an arc ending at a destination procedure reached by executing the call instruction.

Some indirect call instructions may call different procedures for different executions of the program. For these, no links or arcs are made. Instead, each procedure which is a possible destination reached by an indirect call instruction is marked as an indirectly called procedure.

After the construction of arcs to called procedures, and the marking of indirectly called procedures, some remaining procedures may neither have arcs from direct call instructions nor be indirectly called; these are unreachable procedures which cannot be reached by any possible execution of the program.

The preferred embodiment of the invention uses the flow graph for representing the entire machine executable program. Alternative embodiments may use flow graphs constructed directly from the source code, or from some intermediate representation of the program, and may construct a flow graph for a portion of the program.

During execution of the program, the monitoring routines collect test coverage data. The test coverage data are then used to partition the flow graph into executed and unexecuted program components. Certain of the unexecuted components comprise unexecuted destination points. An unexecuted destination point is identified as being an entry point of an unexecuted component where the test execution could have, but did not execute a portion of the program.

In one aspect of the invention, an unexecuted destination point is identified as being an entry point of an unexecuted program component that is the destination of an executed control flow instruction where one of the tested conditions was never encountered. In another aspect of the invention, an unexecuted destination point is identified as being the entry point of an unexecuted procedure which may be indirectly called. In another aspect of the invention, an unexecuted destination point is an entry point of an unreachable procedure.

For each unexecuted destination point, the amount of unexecuted source code or machine executable code which could have been reached by executing the component is determined. The unexecuted destination points are then presented in a decreasing order of this determination. The presentation indicates to the test designer the points in the program that are opportunities to execute more of the program. The presentation also naturally suggests changes which can be made to the test to increase test coverage.

BRIEF DESCRIPTION OF THE DRAWINGS

FIG. 7 is a presentation of test coverage data of a sample program; and

FIG. 8 is a presentation of test coverage data for a compression program.

DETAILED DESCRIPTION OF PREFERRED EMBODIMENTS

Figure 1:
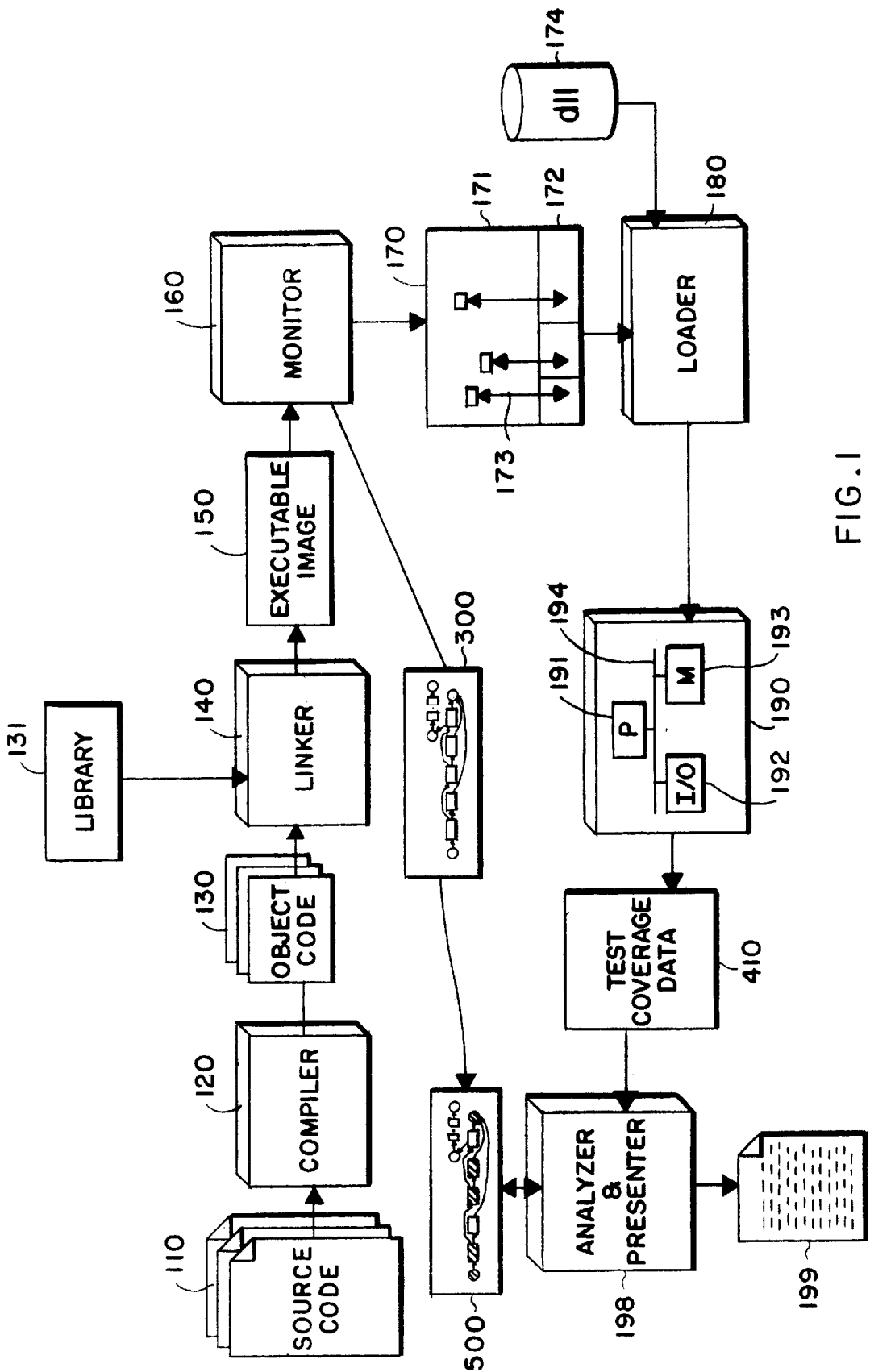
FIG. 1 is a flow diagram of an process according to the invention.

FIG. 1 shows the general flow of data and processes 100 for analyzing and presenting test coverage data of a program according to the preferred embodiment of the invention. A program can be conventionally prepared as source code modules or files 110. A compiler 120 generates corresponding object code modules 130. A linker 140 combines the object code modules 130, perhaps with library routines 131, into an executable image 150.

A monitor 160 makes modifications to the image 150 for the purpose of monitoring the execution of the program. For example, the monitor 160 produces a modified executable program 170 by inserting calls 173 in the executable image 150. The calls will intercept and divert the execution flow to monitoring procedures 172. The procedures 172 are to dynamically collect test coverage data while the program 170 is executing. Alternatively, the intercepting instructions can directly be inserted into the source code 110 if available.

The procedures 172 can be linked to the modified program 171 by the monitor 160. Alternatively, a loader 180 can dynamically link and load the procedures 172 at execution time from a library (dll) 174. The monitor can also construct a flow graph 300 of the program. The flow graph can be complete or partial. A partial graph only represents the portions of the program to be analyzed, a complete flow graph covers the entire program.

The program is loaded into a computer system 190. The system 190 can include a processor (P) 191, memories (M) 192, and input/output interfaces (I/O) 192 connected by a bus 194. Note, the computer 190, or any similar computer can perform any of the process steps such as compiling, lining, instrumenting, loading, executing, analyzing, and presenting as detailed herein.

During execution of the program 170, test coverage data 410 can be collected by the procedures 172. The test data can be stored in the memories 193. Subsequently, the data can be analyzed in conjunction with an enhanced (colored) flow graph 500 to indicate how the portions of the program were executed as a test data coverage presentation 199 by an analyzer and presenter 198.

Figure 2:
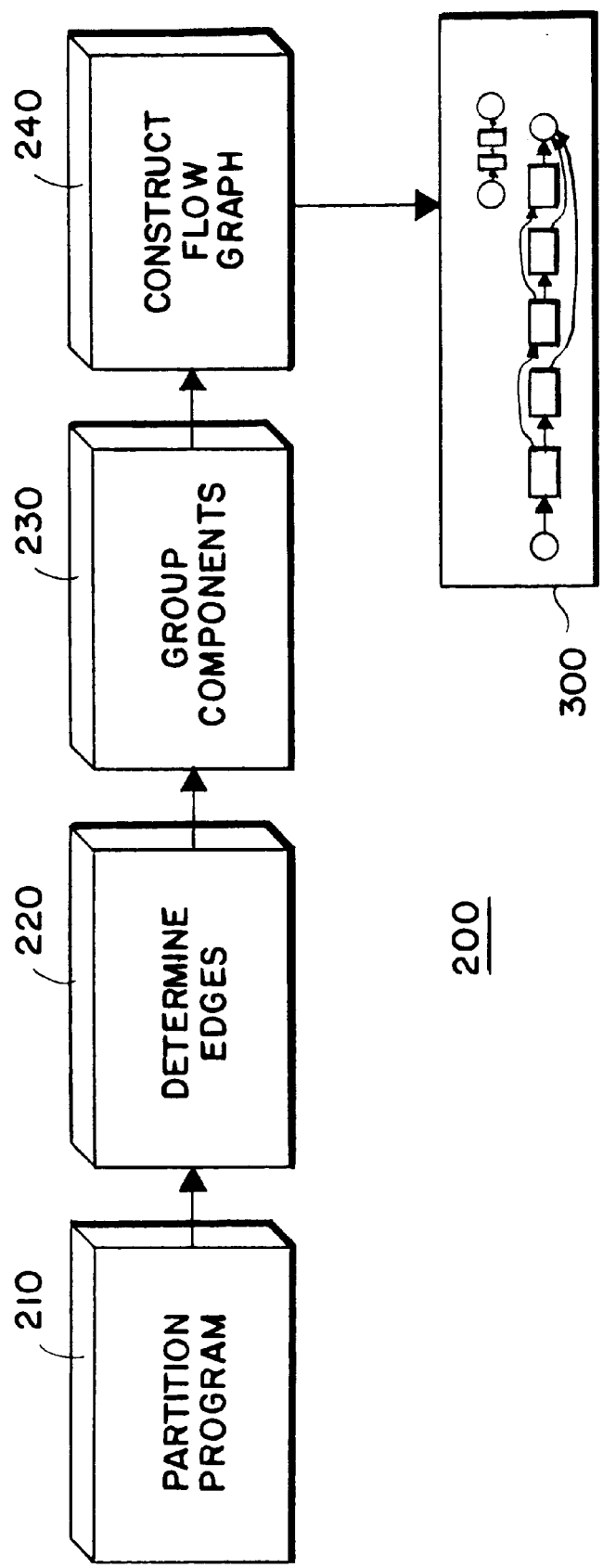
FIG. 2 is a flow diagram of a process for constructing a flow graph of a program to be tested.

FIG. 2 shows the sub-steps of a process 200 for generating the flow graph 300. The flow graph 300 can, for example, be statically constructed by the monitor 160. In step 210, the program is partitioned into procedures defined in the source code 110. Each procedure is partitioned into fundamental program components such as basic blocks. A basic block is defined as a sequence of machine executable instructions that are all executed if any instruction of the block is executed. A basic block has a single entry point and a single exit point, and the execution flow in the basic block is predictably linear.

Figure 3:
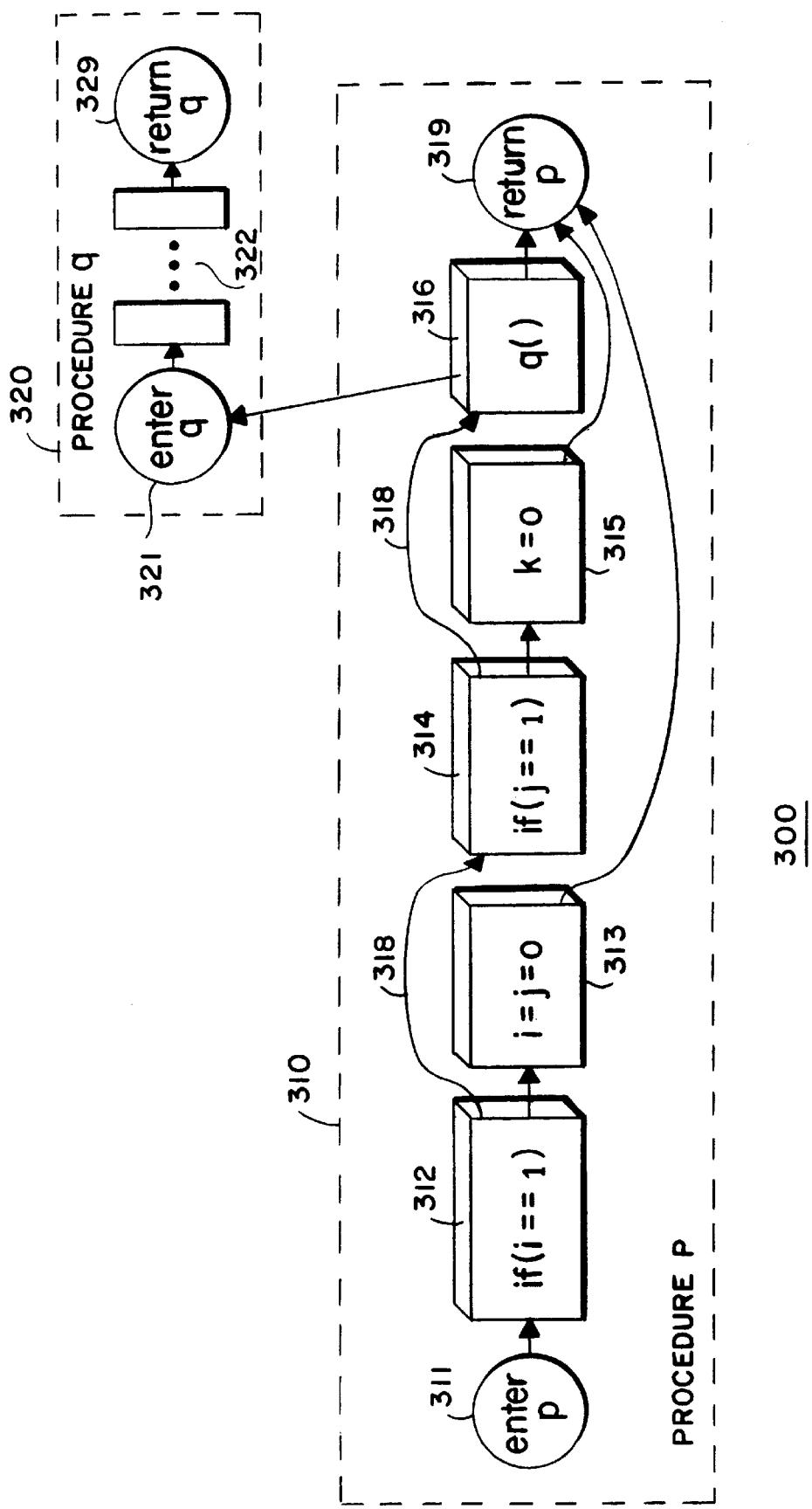
FIG. 3 is a flow graph of the components of the program to be tested.

As shown in greater detail in FIG. 3, the program of Table 1 above can be represented as basic blocks 312–316. Each basic block is a rectangular node in the graph 300. The basic blocks 312–316 are connected by edges (directed arcs) 318 in step 220 of FIG. 2. The edges 318 indicate the possible execution flows among the basic blocks 312–316. For example, the edges represent branch or jump (flow control) instructions at the ends of the basic blocks and procedures. These flow control instructions direct the execution of the program to its different component parts during a particular execution.

A collection of basic blocks can be grouped into a higher level of program components called procedures 310 and 320, step 230 FIG. 2. Procedures are sequences of instructions that have well defined entry and exit points 311–312 and 321 and 329. Typically a procedure is accessed by a "call" instruction, and the execution of a procedure is terminated by a "return" instruction. Once the components and execution flow of the program have been determined, the flow graph 300 can be constructed in step 240.

In FIG. 3, the sample program of Table 1 has been partitioned into procedure (p) 310 and procedure (q) 320. Procedure p 310 includes basic blocks 312–316. The procedure begins at entry point 311, and completes at return 319. The various edges 318 indicate the possible execution flows through the procedure p 310. Procedure q 320 has a body 322, the details of which are not shown for conciseness, and entry and exit points 321 and 329.

Figure 4A:
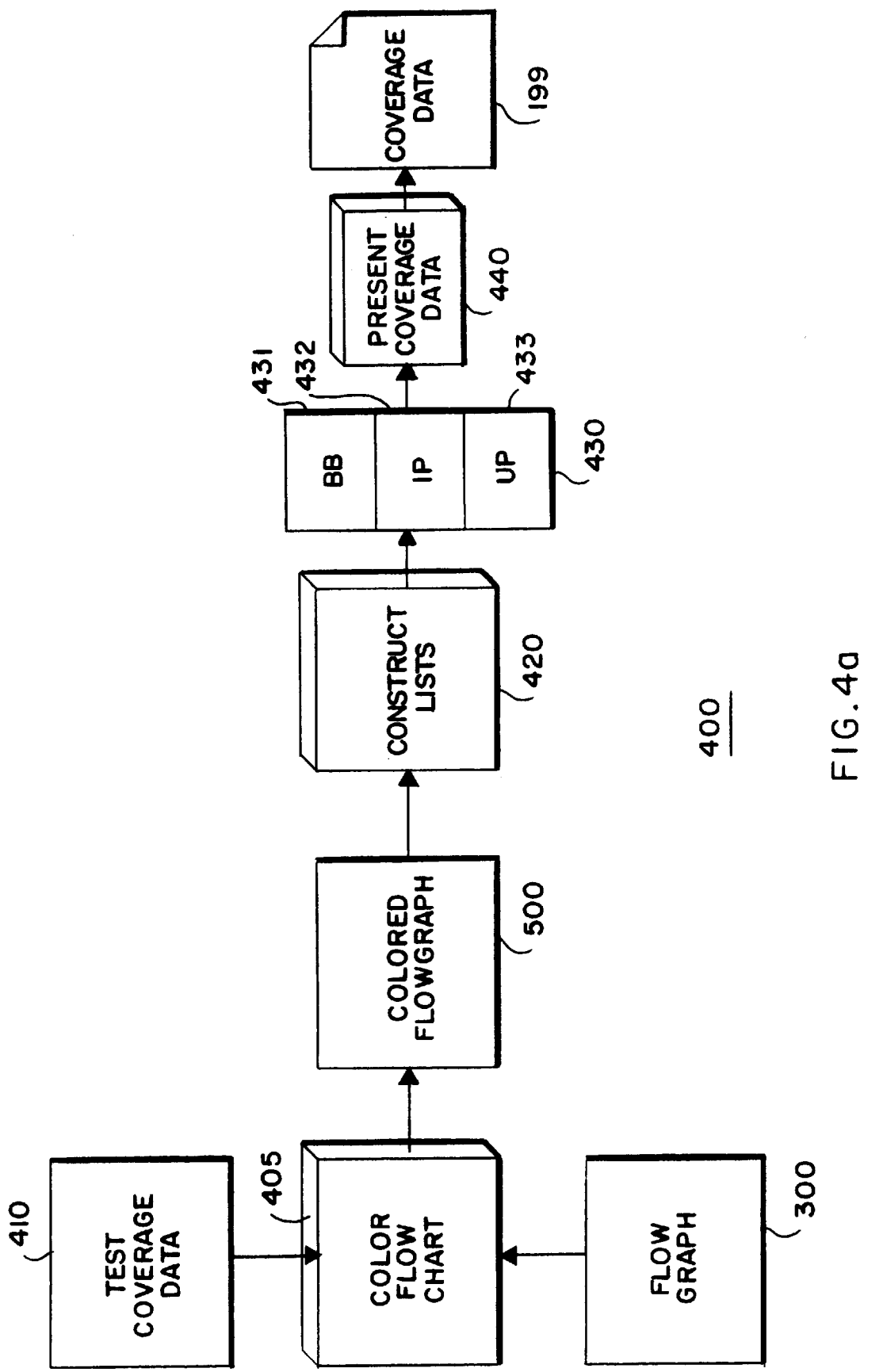
FIG. 4a is a flow diagram of a process for analyzing and presenting test coverage data.

FIG. 4a show the sub-step of a process for analyzing and presenting the test coverage data in greater detail. The basic test coverage data 410 are collected as the program is executing. For example, if the first instruction (entry point) of every basic block is instrumented, then the procedures 172 of FIG. 1 can indicate the execution of a basic block when the execution flow is dynamically intercepted during testing. These data can be stored in the memories 193. Since unexecuted components are not intercepted, there will be no data collection for components. One goal of the invention is to minimize the number of blocks and procedures that have uncollected test coverage data.

Figure 5:
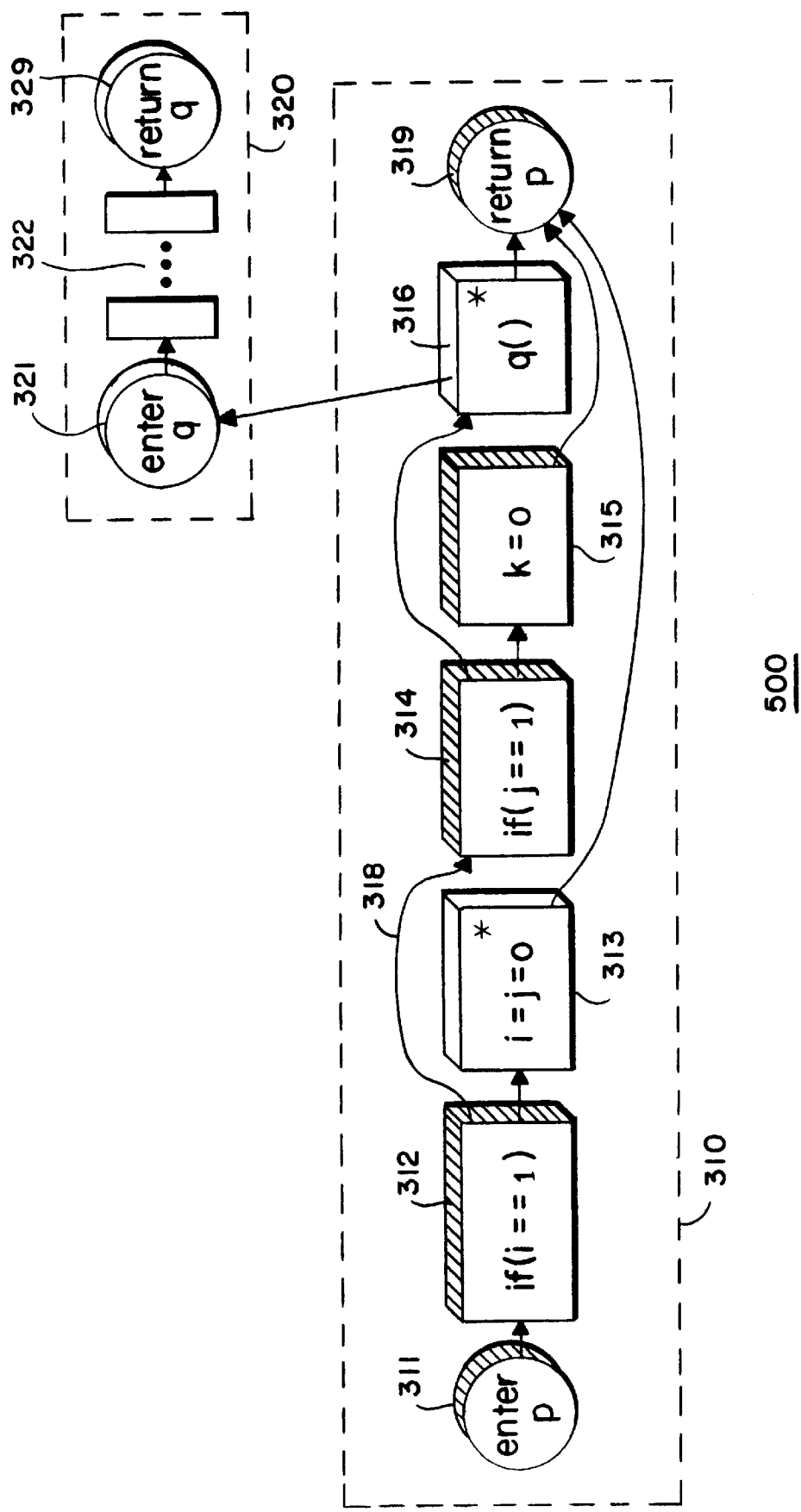
FIG. 5 is a colored flow graph.

The test coverage data 410 and the flow graph 300 can be used to generate the colored flow graph 500 of FIG. 5 in step 405. In FIG. 5, program components which have been executed are marked or colored (hashed in the Figure). Any unexecuted components are left unmarked or uncolored in the graph 500.

In step 420, three lists 430 of unexecuted destination points are generated using the flow graph 300. A basic block list 431 has one entry (destination points BB) for every basic block which was not itself executed, but has a predecessor block which was executed. As shown in FIG. 5, there are two blocks 313 and 316 which qualify. These blocks are marked with asterisks (*). Each of these marked blocks is the successor of an "if" block which was executed, but from which not all possible paths were taken. Therefore, each one of these unexecuted successor blocks defines an opportunity to execute more code.

The second list 432 of FIG. 4a has entries (destination points IP) for unexecuted procedures which may be indirectly called. In most programs, the majority of procedure use direct calls, like from p to q in the example program of FIG. 5. With direct calls, the identity of the called procedure can statically be determined.

However, some procedures may be called indirectly using a run-time variable. In those instances, the called procedure can only be determined dynamically, and the identity of the called procedure may depend an a particular execution of the program with a particular set of input data.

In terms of a flow graph, there are some call sites that call unknown procedures, and there are indirectly called procedures whose call sites are not known prior to execution. If an indirectly called procedure is never called during program execution, there is no way of knowing from which unexecuted call site it might have been entered. By way of example, because it is called only directly, and never indirectly, no entry IP is generated for list 432.

The third list 433, has one entry (destination points UP) for every procedure which has no incoming edges in the call graph and which is not indirectly called. These procedures constitute "dead" code that is unreachable by any execution of the program. In some cases, dead code can account for as much as 30% of the program. For the purposes of test coverage analysis, dead code may represent code that has become superfluous during program development by, for example, multiple authors, and can be removed. The lists 430 can then be used to generate the presentation 199 in step 440 of FIG. 4a.

Figure 4B:
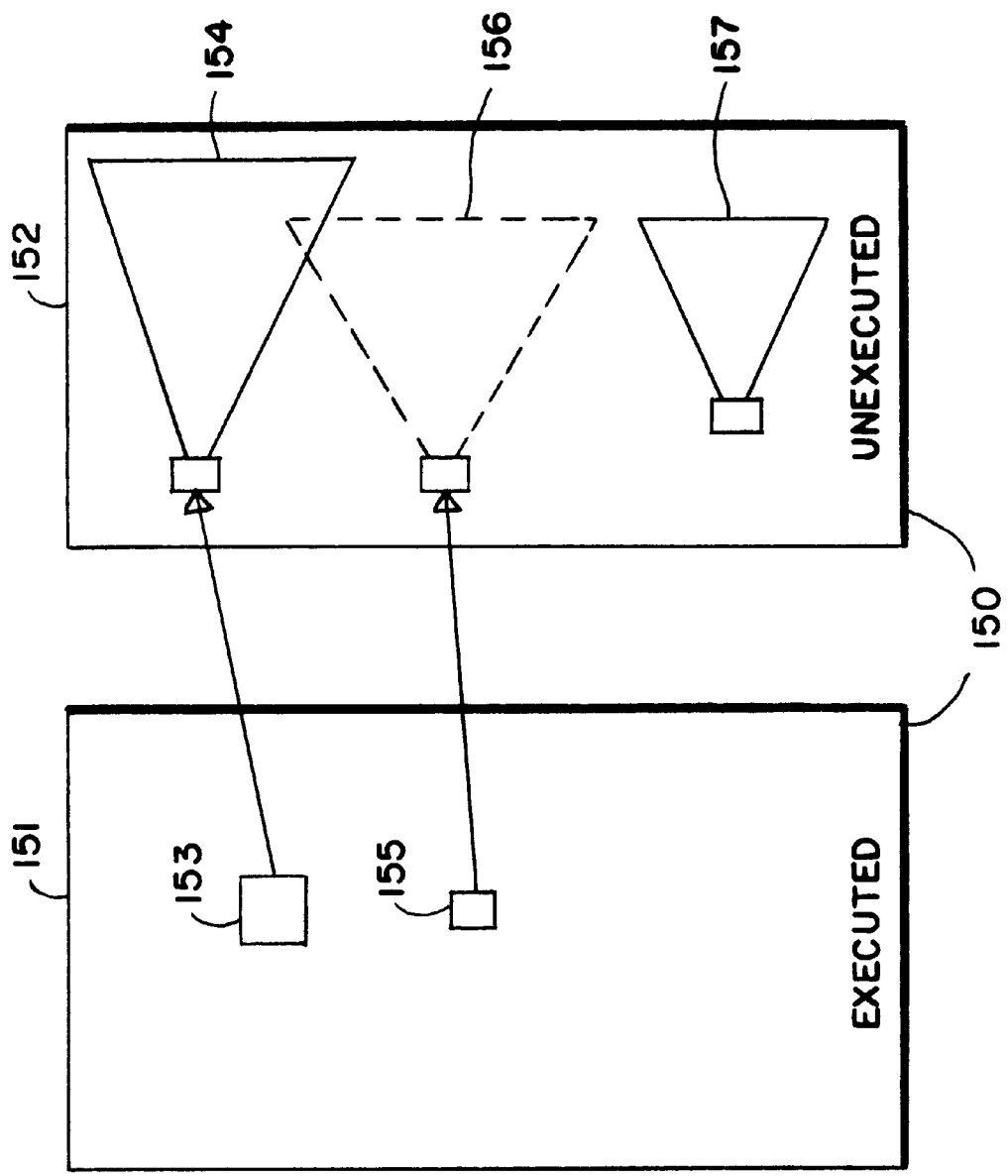
FIG. 4b is a block diagram of the program partitioned into executed and unexecuted program components.

As shown in FIG. 4b, the colored flow graph 500 essentially allows the program 150 to be partitioned into executed and unexecuted portions 151–152. In FIG. 4b, procedure 153 includes one or more branches to basic blocks 154 (BB entries 431) which were not executed. Procedures 156 are unexecuted indirectly called procedures which were not called from executed procedure 155 (IP entries 432), therefore no links exist. Procedures 157 are never called, that is, there is no call edge from the executed portion 151 of the program 150 these procedures.

Figure 6:
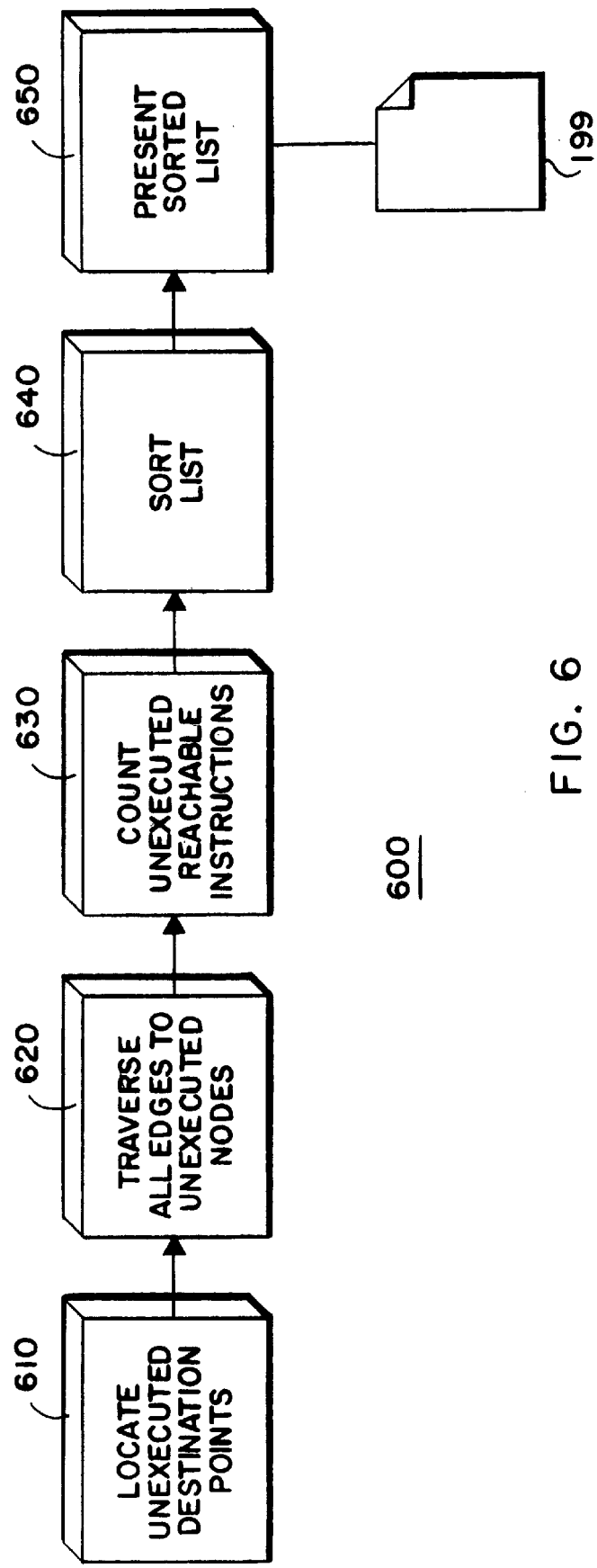
FIG. 6 is a flow diagram of a process for presenting test coverage data.

The sub-steps for preparing the presentation 199 are shown in FIG. 6. The lists 430 of FIG. 4 indicate the unexecuted destination points of the program. The colored flow graph 500 has the property that every unexecuted instruction can be located by starting at the destination points in the lists 430 and only traversing edges to other unexecuted nodes. This is done in steps 610 and 620 of the process of FIG. 6.

During the traversal of the unexecuted components, step 630 counts all instructions which are reachable but not executed. The counts can be stored as a field in the entries of the lists 430. The traversals stop when an executed (colored) node is reached. For instance, the basic block q() 316 of FIG. 5 would count all instructions of procedure q in this way. The block I=j=0 313 would only count itself.

Once the reachable unexecuted instructions have been counted for the unexecuted destination points in the lists, the components including these points can be sorted in decreasing (fewer instructions) importance in step 640. The sorted list can be presented in step 650.

FIG. 7 shows an example presentation 700 for the sample program. The presentation 700 correctly shows that in order to improve the test coverage, the input data should be modified to ensure that procedure q is called from procedure p. This is more important than causing the test I==1 to succeed.

FIG. 8 shows the first entry in a presentation 800 for the well known SPEC benchmark program "compress," a file compression/decompression utility program. In the SPEC suite of programs, compress is used to encode a single file. The methodology of the presentation as disclosed herein has correctly revealed for this particular execution that the procedure for file decompression was never called. Since this procedure accounts for the largest portion of unexecuted code, an improved test coverage is immediately suggested.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

I claim:

1. A computer implemented method for analyzing test coverage data of a program in a computer, comprising the steps of:

generating a flowgraph representing program components of the program and possible execution flows through the program components;

collecting test coverage data while executing the program;

determining executed and unexecuted program components on the flowgraph using the collected test coverage data; and presenting a list of unexecuted program components according to a decreasing order of a number of unexecuted instructions reachable from each unexecuted program component.

2. The method of claim 1 wherein the step of presenting further comprises the steps of:

selecting unexecuted destination points from among the unexecuted program components; and counting the number of unexecuted instructions reachable from each of the selected unexecuted destination points.

3. The method of claim 2 further comprising:

selecting first unexecuted destination points that are targets of executed flow control instructions.

4. The method of claim 2 further comprising:

selecting second unexecuted destination points that are targets of indirect procedure calls.

5. The method of claim 2 further comprising:

selecting third unexecuted destination points that are unreachable by any program component.

6. The method of claim 1 further comprising:

instrumenting a source code representation of the program.

7. The method of claim 1 further comprising:

instrumenting a machine executable code representation the program.

8. The method of claim 1 further comprising:

generating a complete graph of the program.

9. The method of claim 1 further comprising:

generating a partial graph of the program.

10. The method of claim 1 further comprising:

identifying flow control instructions in the program which are decision points, the flow control instructions that can dynamically alter the execution flow to multiple destination points;

adding calls to the program at each possible destination point, the calls to divert the execution flow to monitoring routine for recording test coverage data in a memory of the computer.

11. The method of claim 10 further comprising:

linking the monitoring routine to the program when the program is loaded for execution.

12. The method of claim 1 wherein the graph includes one node for each program component to be represented, and edges of the graph indicate possible execution flows between directly called program components.

13. The method of claim 12 further comprising:

beginning at a particular unexecuted destination point, traversing all edges of the graph linking unexecuted program components while counting until another executed program component is reached.

14. The method of claim 12 further comprising:

coloring nodes of the graph to indicate the unexecuted program components.

15. The method of claim 1 wherein the program components are basic blocks and procedures.

* * * * *